Dec. 4, 1934.   J. B. KERR   1,983,135
PIPE
Filed April 13, 1934   2 Sheets-Sheet 1
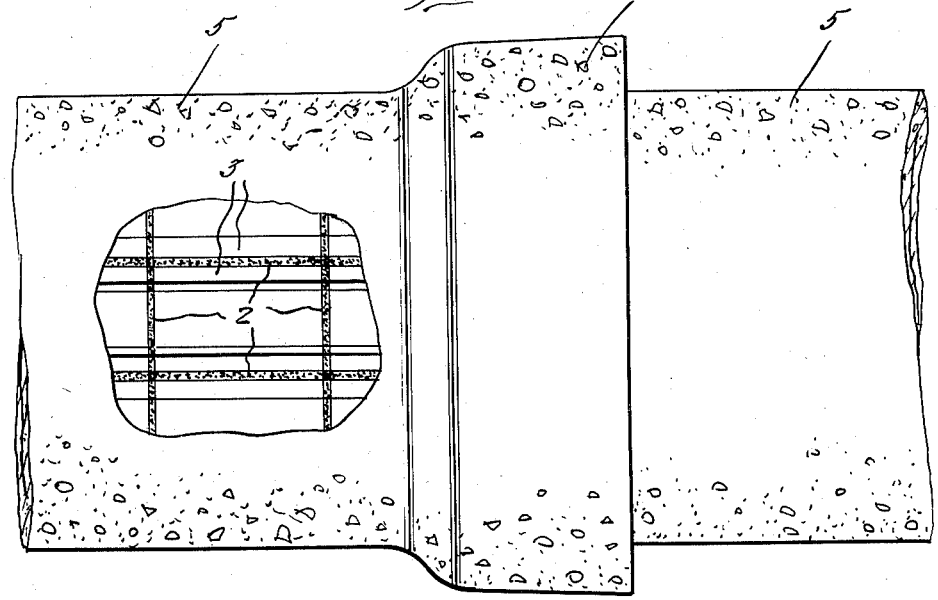
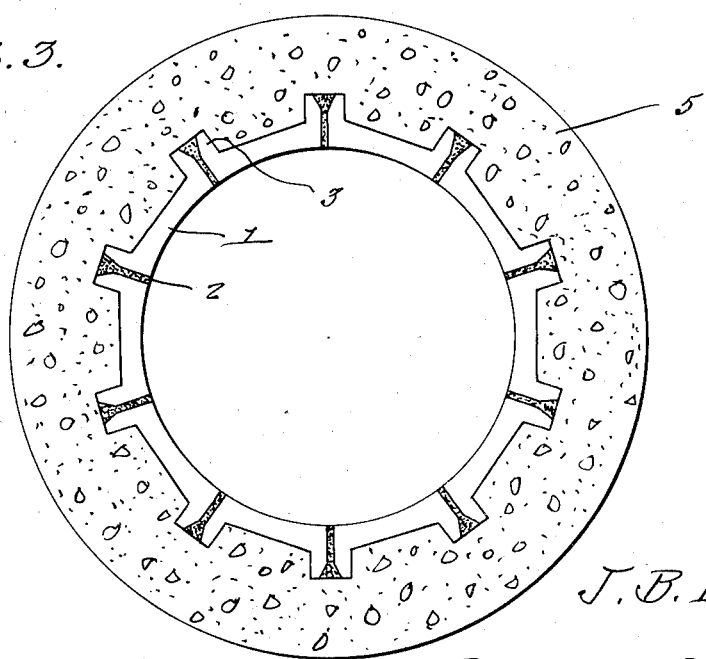
Inventor
J. B. Kerr
By Clarence A. O'Brien
Attorney Dec. 4, 1934.  J. B. KERR  1,983,135
PIPE
Filed April 13, 1934  2 Sheets-Sheet 2

Inventor
J. B. Kerr
By Clarence A. O'Brien
Attorney

Patented Dec. 4, 1934

1,983,135

UNITED STATES PATENT OFFICE 1,983,135

PIPE

John B. Kerr, St. Marys, Pa.

Application April 13, 1934, Serial No. 720,482

1 Claim. (Cl. 72—53)

The present invention relates generally to pipes and more particularly to improvements in pipes which are especially intended for use in the construction of sewer and water conduits but it is to be understood, of course, that a pipe constructed in accordance with the present invention may be used for any purpose for which it may be found adapted and desirable.

An important object of the invention is to provide, in a manner as hereinafter set forth, a pipe of the aforementioned character which is molded from a suitable material, such as cement or cinders, and which is provided with a vitrified lining for preventing the sewerage or other matter which may pass therethrough from impregnating the cement or other material and seeping therethrough and creating an unsanitary condition exteriorly of the pipe, in addition to damaging said pipe in a manner to render the same unfit for use within a comparatively short time.

Another very important object of the present invention is to provide a pipe of the aforementioned character comprising a lining formed from a plurality of segments or sections around which the cement or other material is poured and between which a sealing medium, such as an asphalt compound, is provided, said sections further including novel means whereby they will be securely anchored in the cement or other material.

Other objects of the invention are to provide a pipe of the character set forth which will be comparatively simple in construction, strong, durable and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of the adjacent end portions of a pair of pipes constructed in accordance with the present invention, one of said pipes being broken away to expose the interior thereof.

Figure 3 is an elevational view, looking at one end of a pipe constructed in accordance with the present invention.

Figure 2:
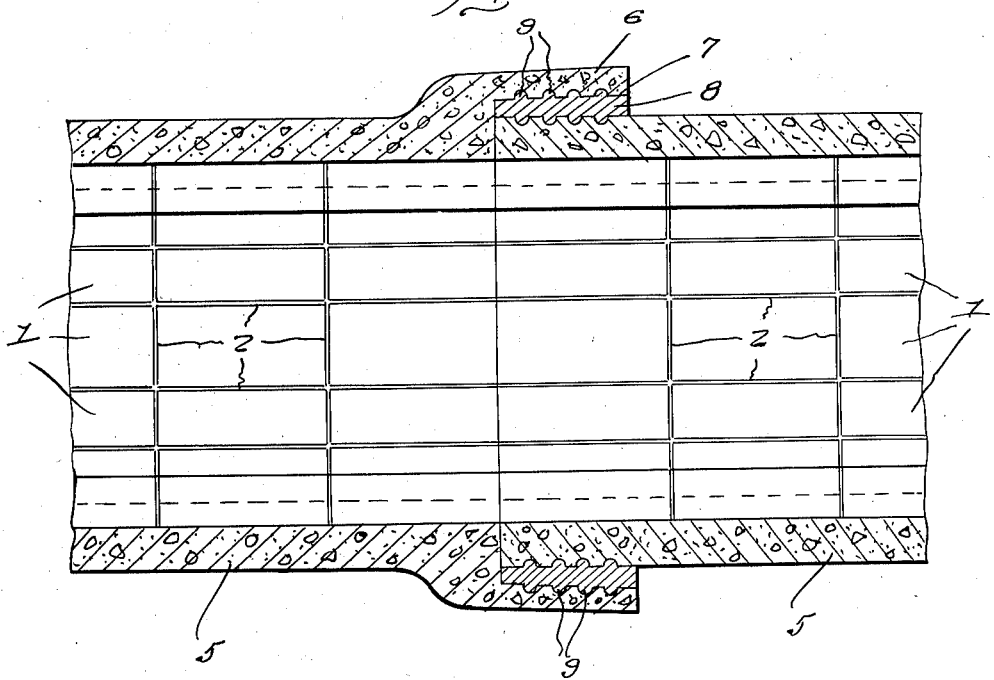
Figure 2 is a view in longitudinal section therethrough.
Figure 4:
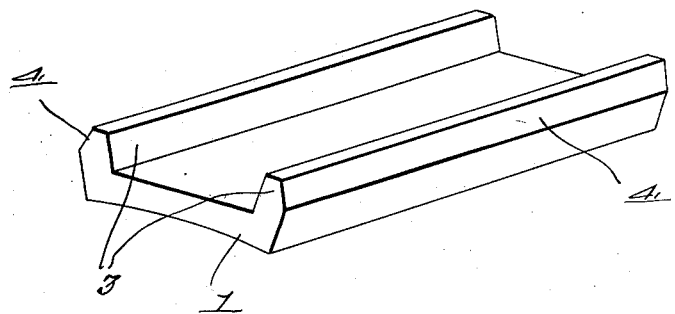
Figure 4 is a detail view in perspective of one of the lining sections.

Referring now to the drawings in detail, it will be seen that the embodiment of the invention which has been illustrated comprises a plurality of substantially segmental lining sections 1 of vitrified material which are assembled in the manner illustrated to advantage in Figure 3 of the drawings. The joints of the lining sections 1 are filled with a sealing medium 2, such as an asphalt compound. Integral flanges 3 are formed on the outer sides of the longitudinal marginal portions of the lining sections 1 and the sides of said flanges 3 which are opposed to each other when the sections are in assembled position are beveled, as at 4, in a manner to define a plurality of spaced, longitudinal, substantially V-shaped grooves or channels, as shown in Figure 3 of the drawings.

The lining sections 1 are assembled in a form, the joints are filled with the asphalt or other sealing compound, and said sections are then securely bound around with a metal strip or other tie. An outer form is then placed in position and the concrete 5 or other material is then poured.

The joint 6 which is provided when the ends of two pipes in accordance with the present invention are engaged with each other is formed to provide an annular chamber 7 for the reception of the sealing compound 8, the opposed walls of said chamber 7 being grooved or corrugated, as at 9.

It will thus be seen that the vitrified lining sections 1, together with the sealed joints 2 thereof will prevent the cement 5 or other material from being damaged by the sewerage or other matter which may pass through the pipe, thus greatly prolonging the usefulness of said pipe and preventing an unhealthful and unsanitary condition from being created exteriorly of the pipe. Of course, any desired number of the lining sections 1 may be used. The compound 2 enters the substantially V-shaped grooves or channels defined by the beveled portions 4 of the flanges 3 to assist in securing the lining sections 1 together in assembled relation.

It is believed that the many advantages of a pipe constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A pipe of the class described comprising a plurality of substantially segmental lining sections of vitrified material, said sections being disposed with the longitudinal edges in spaced parallelism with each other, integral flanges on the outer sides of the longitudinal marginal portions of the lining sections, the opposed upper portion of the sides of the adjacent flanges being beveled and defining a plurality of substantially V-shaped, spaced, parallel grooves, a sealing medium between the lining sections and filling the substantially V-shaped grooves, and a body of cementitious material encircling the lining sections.

JOHN B. KERR.